US012430107B2

United States Patent
Liu et al.

(10) Patent No.: US 12,430,107 B2
(45) Date of Patent: Sep. 30, 2025

(54) REUSABLE SOFTWARE PACKAGING METHOD AND DEVICE

(71) Applicant: INSPUR SUZHOU INTELLIGENT TECHNOLOGY CO., LTD., Jiangsu (CN)

(72) Inventors: Chengcheng Liu, Jiangsu (CN); Feng Li, Jiangsu (CN); Yongfei Sun, Jiangsu (CN)

(73) Assignee: SUZHOU INSPUR INTELLIGENT TECHNOLOGY CO., LTD., Jiangsu (CN)

( * ) Notice: Subject to any disclaimer, the term of this patent is extended or adjusted under 35 U.S.C. 154(b) by 219 days.

(21) Appl. No.: 18/010,317

(22) PCT Filed: Feb. 24, 2021

(86) PCT No.: PCT/CN2021/077644
§ 371 (c)(1),
(2) Date: Dec. 14, 2022

(87) PCT Pub. No.: WO2021/258759
PCT Pub. Date: Dec. 30, 2021

(65) Prior Publication Data
US 2023/0315403 A1 Oct. 5, 2023

(30) Foreign Application Priority Data
Jun. 21, 2020 (CN) .......................... 202010570083.3

(51) Int. Cl.
*H04L 9/00* (2022.01)
*G06F 8/36* (2018.01)
(Continued)

(52) U.S. Cl.
CPC .................. *G06F 8/36* (2013.01); *G06F 8/71* (2013.01); *G06F 21/602* (2013.01)

(58) Field of Classification Search
CPC . G06F 8/36; G06F 8/71; G06F 21/602; G06F 8/61; G06F 21/12
See application file for complete search history.

(56) References Cited

U.S. PATENT DOCUMENTS

2005/0172284 A1* 8/2005 Dandekar ................ G06F 8/61
717/169
2018/0302302 A1* 10/2018 Doggett ................ H04L 67/535
(Continued)

FOREIGN PATENT DOCUMENTS

| CN | 101561762 A | 10/2009 |
|----|-------------|---------|
| CN | 101901160 A | 12/2010 |

(Continued)

OTHER PUBLICATIONS

Voth, D. "Packaging reusable software assets." IEEE Software 21.3 (2004): 107-108.
PCT/CN2021/077644 international search report.

*Primary Examiner* — Syed M Ahsan
(74) *Attorney, Agent, or Firm* — IPro, PLLC

(57) ABSTRACT

Disclosed are a reusable software packaging method and device. The method includes: uploading an original file and an execution script, storing metadata information, verifying the original file and the execution script, packaging the original file, the encrypted execution script and a corresponding table, generating a reusable software package, verifying and decompressing the package, decrypting the execution script and the corresponding table, uploading the original file and the execution script, storing metadata information of the corresponding table, and updating the corresponding table. The present application improves the software deployment effect and the operation and maintenance efficiency.

19 Claims, 3 Drawing Sheets

(51) Int. Cl.
*G06F 8/71* (2018.01)
*G06F 21/60* (2013.01)

(56) References Cited

U.S. PATENT DOCUMENTS

2019/0278589 A1    9/2019  Cook et al.
2020/0356679 A1*  11/2020  Cooke .................... G06F 21/10

FOREIGN PATENT DOCUMENTS

| | | |
|---|---|---|
| CN | 104407856 A | 3/2015 |
| CN | 107908931 A | 4/2018 |
| CN | 111722872 A | 9/2020 |

* cited by examiner

REUSABLE SOFTWARE PACKAGING METHOD AND DEVICE

CROSS-REFERENCE TO RELATED APPLICATION

The present application claims the priority of Chinese patent application filed on Jun. 21, 2020 before the CNIPA, China National Intellectual Property Administration with the application number of CN202010570083.3 and the title of "REUSABLE SOFTWARE PACKAGING METHOD AND DEVICE", which is incorporated herein in its entirety by reference.

FIELD

The present disclosure relates to the field of software and, more particularly, to a reusable software packaging method and device.

BACKGROUND

With the development of science and technology, servers supporting huge data interactions basically need to be managed by operation and maintenance software platforms. However, most operation and maintenance platforms may only deploy software by adding software and scripts manually by onsite operation and maintenance personnel, which, on the one hand, has high requirements for the technical level of operation and maintenance of personnel, and on the other hand, cannot guarantee the deployment quality and efficiency. A few operation and maintenance platforms have built-in a part of software deployment, which may meet a small number of installation requirements. However, software and versions are single and may not be imported or exported flexibly, thus failing to meet daily operation and maintenance requirements.

There is no effective solution to the problems of low security, low flexibility and labor consumption in software package deployment in the prior art.

SUMMARY

In view of the above, the objective of embodiments of the present disclosure is to provide a reusable software packaging method and device, which may ensure security and dedication of a reusable software package, reduce the requirements for personnel, and improve the software deployment effect and operation and maintenance efficiency.

Based on the above objective, a first aspect of an embodiment of the present disclosure provides a reusable software packaging method. The method includes the following steps:
acquiring and scanning, by an initialization module, an original file to be installed and an execution script to be executed to generate metadata information, uploading the original file and the execution script to a file server, and storing the metadata information to a corresponding table of a data server;
acquiring, by a packaging module, the original file and the execution script from the file server, acquiring the corresponding table from the data server, and verifying the original file and the execution script according to the metadata information in the corresponding table;
encrypting, by the packaging module, the execution script and the corresponding table, packaging the original file, the encrypted execution script and the encrypted corresponding table to form a package, and adding an identification code generated based on an operation and maintenance platform and the package to generate a reusable software package;
verifying and decompressing, by an unpacking module, the reusable software package according to the identification code to obtain the package formed by the original file, the encrypted execution script and the encrypted corresponding table; and
decrypting, by the unpacking module, the encrypted execution script and the encrypted corresponding table, uploading the original file and the execution script to the file server, and storing the metadata information of the encrypted and decrypted corresponding table to the corresponding table of the data server so as to update the corresponding table in the data server.

In some implementations, the metadata information includes names, encrypted names, paths, hidden paths, and message digests of the original file and the execution script; the corresponding table includes corresponding relationships between the names, the encrypted names, the paths, the hidden paths, and the message digests of the original file and the execution script; and
the verifying the original file and the execution script according to the metadata information in the corresponding table includes: verifying correctness of the original file and the execution script by using the message digests.

In some implementations, the method further includes: performing, while packaging the original file, the encrypted execution script and the encrypted corresponding table to form the package, additional secondary encryption on the package; and
adding an identification code generated based on an operation and maintenance platform and the package includes: determining the identification code based on the operation and maintenance platform and package metadata information generated by the package after secondary encryption, and adding the identification code to the package.

In some implementations, the uploading the original file and the execution script to a file server includes: uploading the original file and the execution script to the file server using a POST command; and storing the metadata information of the corresponding table to the corresponding table of the data server includes: storing the metadata information of the corresponding table to the corresponding table of the data server using the POST command.

In some implementations, updating the corresponding table in the data server includes: acquiring the updated metadata information using a GET command, and updating the corresponding table according to the updated metadata information using a PUT command.

A second aspect of an embodiment of the present disclosure provides a reusable software packaging device. The device includes:
a processor; and
a memory storing a program code executable by the processor, the program code, when executed, performing the following steps:
acquiring and scanning, by an initialization module, an original file to be installed and an execution script to be executed to generate metadata information, uploading the original file and the execution script to a file server, and storing the metadata information to a corresponding table of a data server;

acquiring, by a packaging module, the original file and the execution script from the file server, acquiring the corresponding table from the data server, and verifying the original file and the execution script according to the metadata information in the corresponding table;

encrypting, by the packaging module, the execution script and the corresponding table, packaging the original file, the encrypted execution script and the encrypted corresponding table to form a package, and adding an identification code generated based on an operation and maintenance platform and the package to generate a reusable software package;

verifying and decompressing, by an unpacking module, the reusable software package according to the identification code to obtain the package formed by the original file, the encrypted execution script and the encrypted corresponding table; and decrypting, by the unpacking module, the encrypted execution script and the encrypted corresponding table, uploading the original file and the execution script to the file server, and storing the metadata information of the encrypted and decrypted corresponding table to the corresponding table of the data server so as to update the corresponding table in the data server.

In some implementations, the metadata information includes names, encrypted names, paths, hidden paths, and message digests of the original file and the execution script; the corresponding table includes corresponding relationships between the names, the encrypted names, the paths, the hidden paths, and the message digests of the original file and the execution script; and verifying the original file and the execution script according to the metadata information in the corresponding table includes: verifying correctness of the original file and the execution script by using the message digests.

In some implementations, a step of performing, while packaging the original file, the encrypted execution script and the encrypted corresponding table to form the package, additional secondary encryption on the package is further included; and the adding an identification code generated based on an operation and maintenance platform and the package includes: determining the identification code based on the operation and maintenance platform and package metadata information generated by the package after secondary encryption, and adding the identification code to the package.

In some implementations, the uploading the original file and the execution script to a file server includes: uploading the original file and the execution script to the file server using a POST command; and storing the metadata information of the corresponding table to the corresponding table of the data server includes: storing the metadata information of the corresponding table to the corresponding table of the data server using the POST command.

In some implementations, updating the corresponding table in the data server includes: acquiring the updated metadata information using a GET command, and updating the corresponding table according to the updated metadata information using a PUT command.

The present disclosure has the following beneficial effects: the reusable software packaging method and device according to the embodiments of the present disclosure adopt the following technical solution: acquiring and scanning the original file to be installed and the execution script to be executed to generate the metadata information, uploading the original file and the execution script to the file server, and storing the metadata information to the corresponding table of the data server; acquiring the original file and the execution script from the file server, acquiring the corresponding table from the data server, and verifying the original file and the execution script according to the metadata information in the corresponding table; encrypting the execution script and the corresponding table, packaging the original file, the encrypted execution script and the encrypted corresponding table to form the package, and adding the identification code generated based on the operation and maintenance platform and the package to generate the reusable software package; verifying and decompressing the reusable software package according to the identification code to obtain the package formed by the original file, the encrypted execution script and the encrypted corresponding table; and decrypting the encrypted execution script and the encrypted corresponding table, uploading the original file and the execution script to the file server, storing the metadata information of the corresponding table to the corresponding table of the data server, and updating the corresponding table. In this way, the security and dedication of the reusable software package may be ensured, the requirements for personnel may be reduced, and the software deployment effect and operation and maintenance efficiency may be improved.

BRIEF DESCRIPTION OF THE DRAWINGS

For clearer descriptions of the technical solutions according to the embodiments of the present disclosure or in the related art, drawings that are to be referred for description of the embodiments or the prior art are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

For clearer descriptions of the objectives, technical solutions, and advantages of the present disclosure, embodiments of the present disclosure are described hereinafter in detail with reference to embodiments and the accompanying drawings.

It should be noted that all expressions using "first" and "second" in the embodiments of the present disclosure are intended to distinguish two different entities or parameters with the same name. It may be seen that "first" and "second" are merely for the convenience of expressions and should not be construed as limiting the embodiments of the present disclosure, which will not be stated one by one in subsequent embodiments.

Figure 1:
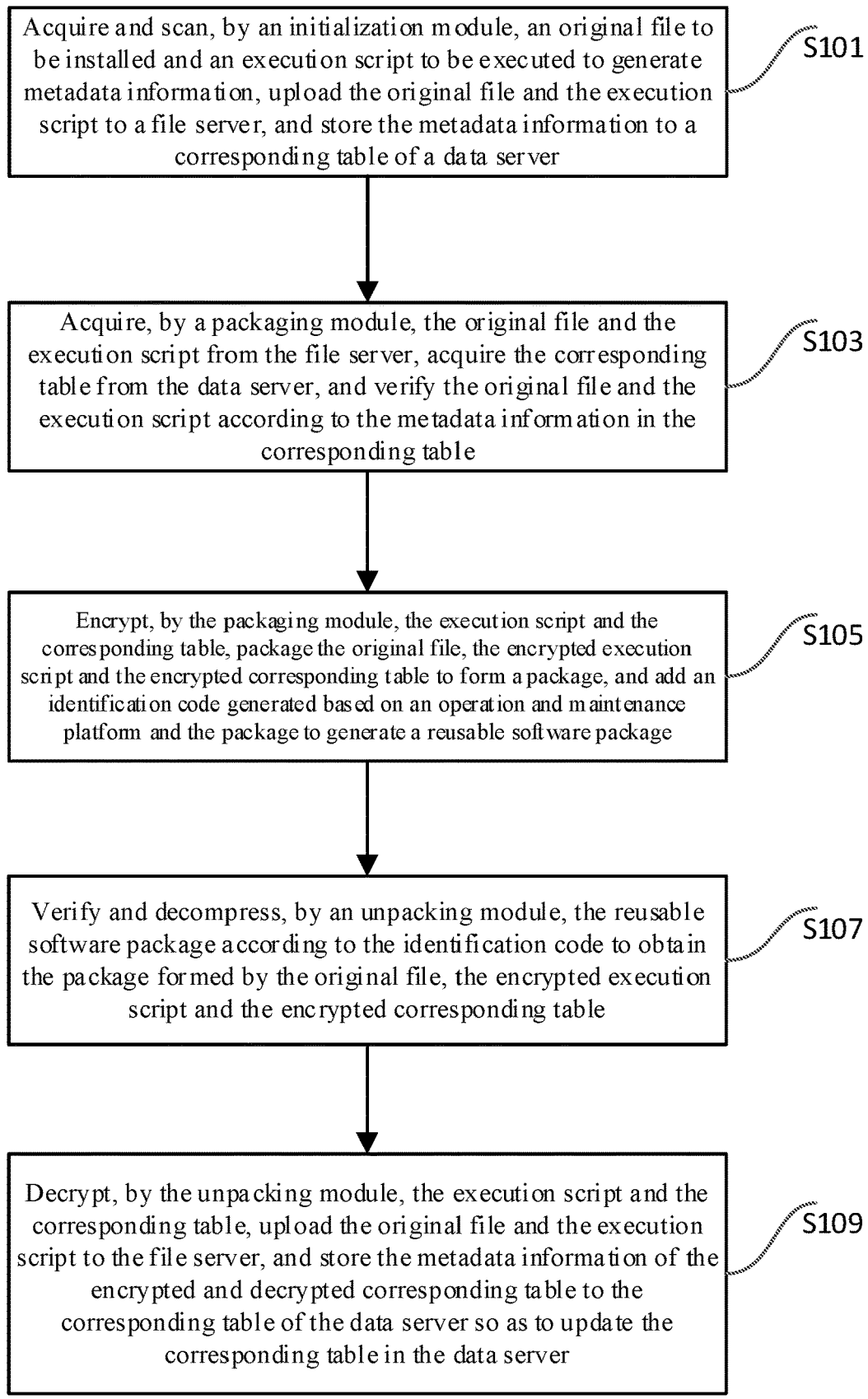
FIG. 1 is a schematic flow chart of a reusable software packaging method according to the present disclosure.

Based on the above objective, a first aspect of an embodiment of the present disclosure provides a reusable software packaging method, which may ensure security and dedication of a reusable software package, reduce the requirements for personnel, and improve the software deployment effect and operation and maintenance efficiency. FIG. 1 illustrates a schematic flow chart of the reusable software packaging method according to the present disclosure.

The reusable software packaging method, as shown in FIG. 1, includes the following steps:

Step S101: An initialization module acquires and scans an original file to be installed and an execution script to be executed to generate metadata information, uploads the original file and the execution script to a file server, and stores the metadata information to a corresponding table of a data server.

Step S103: A packaging module acquires the original file and the execution script from the file server and acquires the corresponding table from the data server, and verifies the original file and the execution script according to the metadata information in the corresponding table.

Step S105: The packaging module encrypts the execution script and the corresponding table, packages the original file, the encrypted execution script and the encrypted corresponding table to form a package, and adds an identification code generated based on an operation and maintenance platform and the package to generate a reusable software package.

Step S107: An unpacking module verifies and decompresses the reusable software package according to the identification code to obtain the package formed by the original file, the encrypted execution script and the encrypted corresponding table.

Step S109: The unpacking module decrypts the encrypted execution script and the encrypted corresponding table, uploads the original file and the execution script to the file server, and stores the metadata information of the encrypted and decrypted corresponding table to the corresponding table of the data server so as to update the corresponding table in the data server.

It will be appreciated by persons of ordinary skill in the art that all or part of the flow of the above method embodiments may be implemented by a computer program instructing associated hardware, and the program may be stored in a computer-readable storage medium. The program, when executed, may include the flow of the above method embodiments. The storage medium may be a magnetic disk, a compact disk, a read-only memory (ROM), or a random access memory (RAM), etc. Embodiments of the computer program may achieve the same or similar effects as any of the above method embodiments corresponding thereto.

In some implementations, the metadata information includes names, encrypted names, paths, hidden paths, and message digests of the original file and the execution script. The corresponding table includes corresponding relationships between the names, the encrypted names, the paths, the hidden paths, and the message digests of the original file and the execution script.

Verifying the original file and the execution script according to the metadata information in the corresponding table includes: the correctness of the original file and the execution script is verified by using the message digests.

In some implementations, the method further includes: additional secondary encryption is performed on the package while the original file, the encrypted execution script and the encrypted corresponding table are packaged to form the package.

Adding the identification code generated based on the operation and maintenance platform and the package includes: the identification code is determined based on the operation and maintenance platform and package metadata information generated by the package after secondary encryption, and is added to the package.

In some implementations, uploading the original file and the execution script to the file server includes: the original file and the execution script are uploaded to the file server using a POST command; and storing the metadata information of the corresponding table to the corresponding table of the data server includes: the metadata information of the corresponding table is stored to the corresponding table of the data server using the POST command.

In some implementations, updating the corresponding table in the data server includes: the updated metadata information is acquired using a GET command, and the corresponding table is updated according to the updated metadata information using a PUT command.

Figure 2:
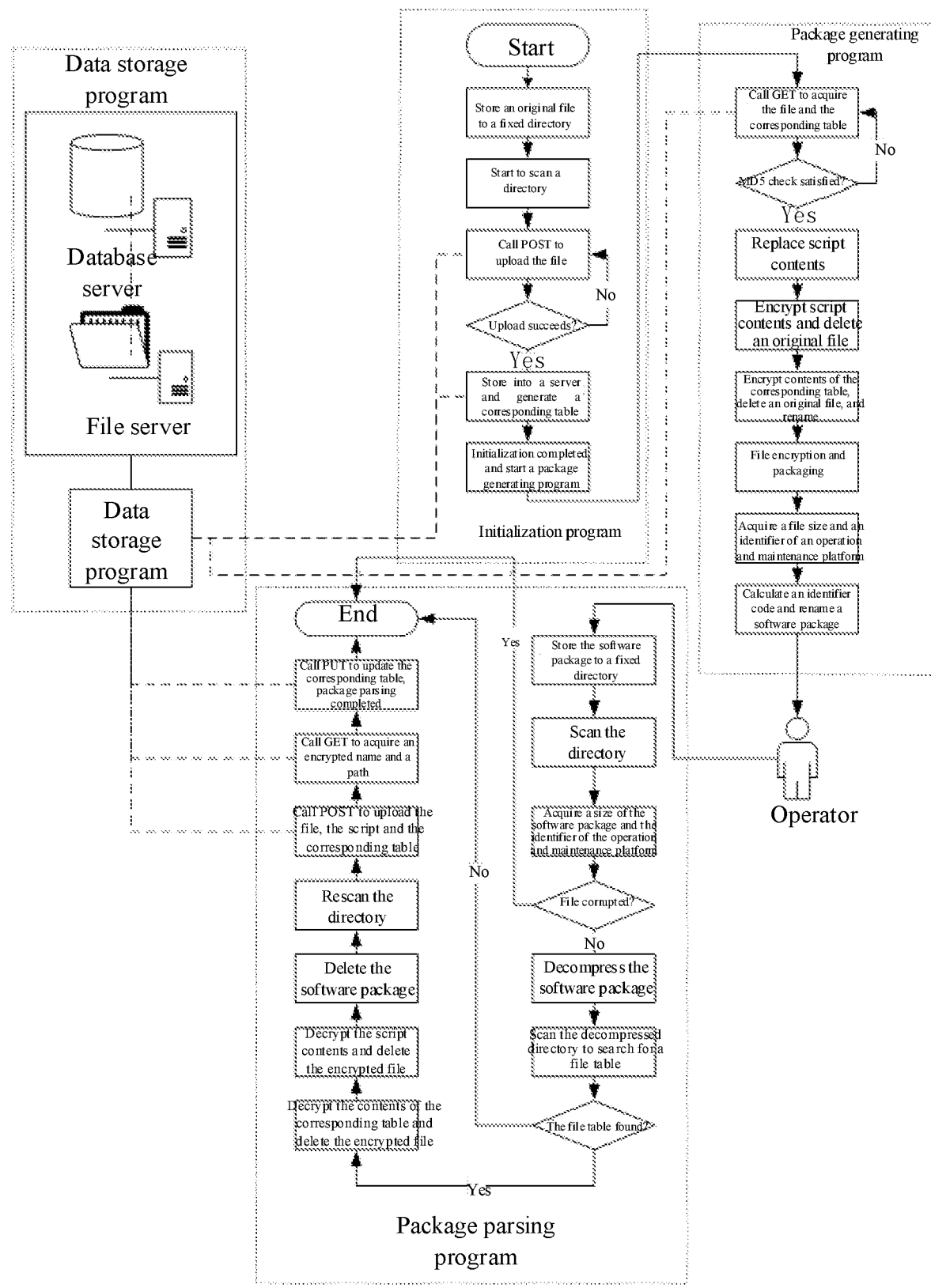
FIG. 2 is a detailed flow chart of a reusable software packaging method according to the present disclosure.

It should be noted that, as shown in FIG. 2, the whole flow involves two GET command updates, one is during metadata of a package generating program is uploaded and the other is during a package parsing program.

The method according to the embodiment of the present disclosure may also be implemented as a computer program executed by a CPU, and the computer program may be stored in a computer-readable storage medium. The computer program, when executed by the CPU, executes the above functions defined in the method according to the embodiment of the present disclosure. The steps of the method and system elements may also be implemented through a controller and a computer-readable storage medium for storing a computer program that enables the controller to implement the above steps or element functions.

The present disclosure mainly includes four parts: a data storage program, an initialization program, the package generating program, and the package parsing program.

The data storage program is mainly configured to store original data before generation of the software package and data after package import. The main data includes: an original file, a script, file information, and a storage path. The data storage program relies on the database server and the file server to receive and store data into and read data from the file server and the database server through interaction with the initialization program, the package generating program and the package parsing program. Four operation modes of GET, POST, PUT, and DELETE are provided, which are used for acquiring, uploading, updating, and deleting data. The data storage program may automatically encrypt an original file name and hide actual storage paths of the original file and the script.

The initialization program, the original file to be installed and the script are uploaded before generating the reusable software package, and automatically imported to the file server and the database server are achieved through interaction with the data storage program, so as to complete initialization.

The package generating program, upon the completion of initialization, starts software package generation at the same time. The uploaded original file and script are acquired through the data storage program, and are packaged and encrypted, and an identification code of an operation and maintenance platform is added, such that a reusable software package which is available only on the current operation and maintenance platform is generated.

The package parsing program is configured to parse the generated reusable software package. A user imports the reusable software package through the current program. If it is identified that the reusable software package is not corrupted, the reusable software package is decrypted and decompressed, and the data storage program is invoked to store file and script information to the file and the database server.

Implementations of the present disclosure are further illustrated below with reference to the embodiment shown in FIG. 2.

Phase 1: Initialization of Original Data
(1) The original file to be installed and the written execution script are stored to a fixed directory of an operating system.
(2) The initialization program is started, and scans the set directory in (1) to obtain a file list and file information under the directory.
(3) The initialization program sends a file name and a file path to the data storage program through a POST operation of the data storage program, and starts to upload the original file.
(4) Upon completion of POST of the data storage program, the original file and the script are successfully stored to the file server, and the file name, a file size and the storage path are stored to the data server. At the same time, a corresponding table including the original file name, the name encrypted by the data storage program, and the hidden path is generated, and the initialization program is notified of the completion of uploading. The corresponding table is as follows:

| Corresponding relationship 1 | Original file name | Encrypted name | Original path | Hidden path | MD5 value |
|---|---|---|---|---|---|
| Corresponding relationship 2 | Script file name | Encrypted name | Original path | Hidden path | MD5 value |

(5) Upon receiving the notification of the completion of uploading, the initialization program sends the file list information to the package generating program to inform that the original data has been initialized.

Phase 2: Generation of the Reusable Software Package
(6) The package generating program receives the file list information from the initialization program, and acquires a file to be packaged after name encryption, a script and corresponding table information via a GET operation of the data storage program.
(7) Upon completion of the GET operation of the data storage program, the package generating program checks whether an MD5 value of a downloaded file is consistent with the corresponding table via an md5sum command.
(8) According to the corresponding table information, the package generating program replaces the original file name in the script with the encrypted file name, and replaces, if the script includes a path, the path together.
(9) The package generating program encrypts contents of the script file, and deletes an original script file at the same time. An encryption command is: openssl enc-des-e-a-k password -in filename -out filename.des, wherein password is a custom password, and filename is the script file name encrypted by the data storage program.
(10) The package generating program saves the corresponding table information acquired in (6) as text, encrypts contents of the corresponding table file with the same process as (9), renames the file as table, and deletes an original corresponding table file at the same time.
(11) The package generating program packages, compresses and encrypts the downloaded file to be packaged in (6), the encrypted script and the corresponding table file in (9) and (10). A packaging command is: tar-zcvf-dirname|openssl des3-salt-k password|dd of=dirname.des3, wherein password is a custom password, and dirname is a file directory.
(12) The package generating program renames the encrypted compressed package generated in 11. The name includes three parts: software name, version number and identification code, which are separated by special symbols. Taking the underlined "_" as an example, a final name is: mysql_5.6_74512. The identification code is available merely on the current operation and maintenance platform, and may also be used as an identifier to indicate that a file is not corrupted. The identification code is generated as follows:

Set the identification code as $f_s$, the number of letters of the English name of the operation and maintenance platform as n, the alphabet sequence corresponding to each letter thereof as $x_1, x_2, \ldots, x_n$, and the number of bytes of the file generated in (11) as $w_1$, the identification code may be obtained as:

$$f_s = \sum_{i=1}^{n} n * x_i + w_1 + \prod_{i=1}^{n} i$$

When the file name is limited in length and the identification code is limited to m bits, the identification code is intercepted from the last m bits of $f_s$.
(13) Upon completion of renaming, the file obtained in (6) is deleted, and generation of the reusable software package is completed.

Phase 3: Parsing of the Reusable Software Package
(14) The reusable software package generated in (13) is stored to a fixed directory of the operating system.
(15) The package parsing program is started, and scans the set directory in (14) to acquire the name of the reusable software package and the number $w_2$ of bytes of the file, and the last m bits are intercepted correspondingly when the identification code is limited to m bits.
(16) The identification code is obtained from the package name. According to the algorithm in (12), the number of letters of the English name of the operation and maintenance platform is n, and the alphabet sequence corresponding to each letter thereof is $x_1, x_2, \ldots, x_n$, such that a value $\Sigma_{i=1}^{n} n*x_i$ is obtained. Whether $w_1$ is equal to $w_2$ is judged, and if the two are equal, the subsequent steps are performed.
(17) The reusable software package is decompressed. A decompression command is: dd if=filename|openssl des3-d-k password|tar zxvf-, wherein password is a custom password, and filename is the name of the reusable software package.
(18) The directory is scanned to find the file table, the contents of the corresponding table file are decrypted, and the encrypted file is deleted. A decryption command is: openssl enc-des-d-a-k password -in filename -out desname, wherein password is a custom password, filename is the name of the file to be decrypted, and desname is the name of the generated target file.
(19) Information of the corresponding table file is read to acquire the script file name, the decryption command in (18) is executed, the contents of the script file are decrypted, and the encrypted file is deleted. After all script files are decrypted, the reusable software package under the current directory is deleted.

(20) The package parsing program rescans the set directory, and uploads the installation file, the script and the corresponding table through the POST operation of the data storage program. Upon receiving a notification of completion of uploading, the latest encrypted file name and hidden path are acquired through the GET operation, and the corresponding table is updated through the PUT operation. Upon completion of the update, package parsing is completed.

According to the above embodiment, the reusable software packaging method according to the embodiment of the present disclosure includes acquiring and scanning the original file to be installed and the execution script to be executed to generate the metadata information, uploading the original file and the execution script to the file server, and storing the metadata information to the corresponding table of the data server; acquiring the original file and the execution script from the file server, acquiring the corresponding table from the data server, and verifying the original file and the execution script according to the metadata information in the corresponding table; encrypting the execution script and the corresponding table, packaging the original file, the encrypted execution script and the encrypted corresponding table to form the package, and adding the identification code generated based on the operation and maintenance platform and the package to generate the reusable software package; verifying and decompressing the reusable software package according to the identification code to obtain the package formed by the original file, the encrypted execution script and the encrypted corresponding table; and decrypting the encrypted execution script and the encrypted corresponding table, uploading the original file and the execution script to the file server, and storing the metadata information of the encrypted and decrypted corresponding table to the corresponding table of the data server so as to update the corresponding table in the data server. In this way, the security and dedication of the reusable software package may be ensured, the requirements for personnel may be reduced, and the software deployment effect and operation and maintenance efficiency may be improved.

In particular, it should be pointed out that the steps in each embodiment of the reusable software packaging method may be crossed, replaced, added and deleted, therefore, these reasonable permutations and combinations of the reusable software packaging method shall also fall within the scope of the present disclosure, and the scope of the present disclosure shall not be limited to the embodiments.

Figure 3:
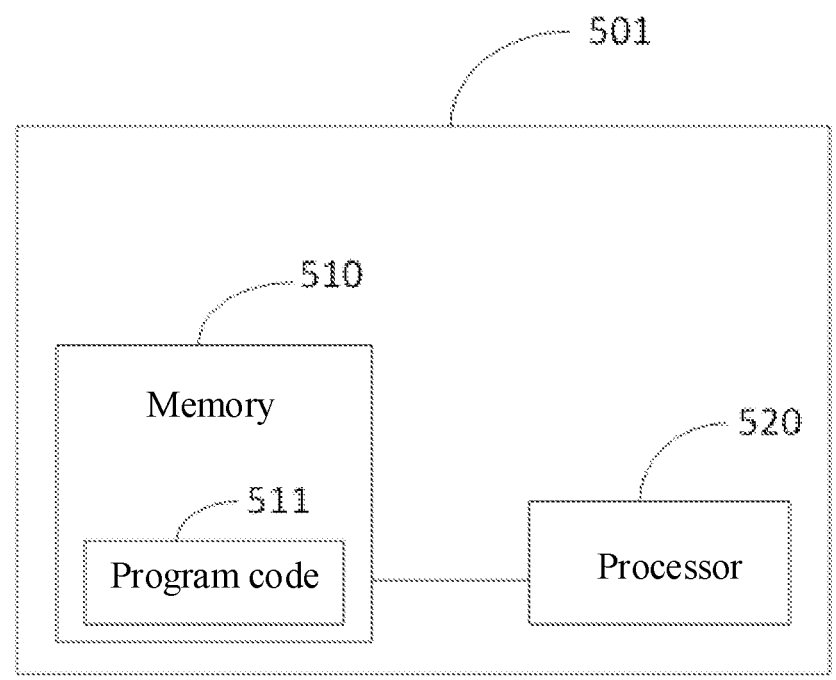
FIG. 3 is a schematic structural diagram of a reusable software packaging device according to the present disclosure.

Based on the above objective, a second aspect of an embodiment of the present disclosure provides a reusable software packaging device, which may ensure security and dedication of reusable software packages, reduce the requirements for personnel, and improve the software deployment effect and operation and maintenance efficiency. As shown in FIG. 3, the reusable software packaging device 501 includes:

a processor 520; and a memory 510 storing a program code 511 executable by the processor 520. The program code 511, when executed, performs the following steps:

An initialization module acquires and scans an original file to be installed and an execution script to be executed to generate metadata information, uploads the original file and the execution script to a file server, and stores the metadata information to a corresponding table of a data server.

A packaging module acquires the original file and the execution script from the file server and acquires the corresponding table from the data server, and verifies the original file and the execution script according to the metadata information in the corresponding table.

The packaging module encrypts the execution script and the corresponding table, packages the original file, the encrypted execution script and the encrypted corresponding table to form a package, and adds an identification code generated based on an operation and maintenance platform and the package to generate a reusable software package.

An unpacking module verifies and decompresses the reusable software package according to the identification code to obtain the package formed by the original file, the encrypted execution script and the encrypted corresponding table.

The unpacking module decrypts the encrypted execution script and the encrypted corresponding table, uploads the original file and the execution script to the file server, and stores the metadata information of the encrypted and decrypted corresponding table to the corresponding table of the data server so as to update the corresponding table in the data server.

In some implementations, the metadata information includes names, encrypted names, paths, hidden paths, and message digests of the original file and the execution script. The corresponding table includes corresponding relationships between the names, the encrypted names, the paths, the hidden paths, and the message digests of the original file and the execution script.

Verifying the original file and the execution script according to the metadata information in the corresponding table includes: the correctness of the original file and the execution script is verified with the message digests.

In some implementations, a step of performing, while packaging the original file, the encrypted execution script and the encrypted corresponding table to form the package, additional secondary encryption on the package is further included.

Adding the identification code generated based on the operation and maintenance platform and the package includes: the identification code is determined based on the operation and maintenance platform and package metadata information generated by the package after secondary encryption, and is added to the package.

In some implementations, uploading the original file and the execution script to the file server includes: the original file and the execution script are uploaded to the file server using a POST command; and storing the metadata information of the corresponding table to the corresponding table of the data server includes: the metadata information of the corresponding table is stored to the corresponding table of the data server using the POST command.

In some implementations, updating the corresponding table in the data server includes: the updated metadata information is acquired using a GET command, and the corresponding table is updated according to the updated metadata information using a PUT command.

According to the above embodiment, the reusable software packaging device according to the embodiment of the present disclosure adopts the following technical solution: acquiring and scanning the original file to be installed and the execution script to be executed to generate the metadata information, uploading the original file and the execution script to the file server, and storing the metadata information to the corresponding table of the data server; acquiring the original file and the execution script from the file server, acquiring the corresponding table from the data server, and verifying the original file and the execution script according to the metadata information in the corresponding table; encrypting the execution script and the corresponding table, packaging the original file, the encrypted execution script and the encrypted corresponding table to form the package, and adding the identification code generated based on the operation and maintenance platform and the package to generate the reusable software package; verifying and decompressing the reusable software package according to the identification code to obtain the package formed by the original file, the encrypted execution script and the encrypted corresponding table; and decrypting the encrypted execution script and the encrypted corresponding table, uploading the original file and the execution script to the file server, and storing the metadata information of the encrypted and decrypted corresponding table to the corresponding table of the data server so as to update the corresponding table in the data server. In this way, the security and dedication of the reusable software package may be ensured, the requirements for personnel may be reduced, and the software deployment effect and operation and maintenance efficiency may be improved.

In particular, it should be pointed out that the above embodiment of the reusable software packaging device uses the embodiment of the reusable software packaging method to describe the working process of each module, and it would have readily occurred to persons skilled in the art to apply these modules to other embodiments of the reusable software packaging method. Of course, since the steps in the embodiment of the reusable software packaging method may be crossed, replaced, added and deleted, these reasonable permutations and combinations of the reusable software packaging device shall also fall within the scope of the present disclosure, and the scope of the present disclosure shall not be limited to the embodiments.

The above are exemplary embodiments of the present disclosure, but it shall be noted that various changes and modifications may be made without deviating from the scope of the embodiments of the present disclosure as defined by the appended claims. The functions, steps, and/or actions of the method claims according to the disclosed embodiments described herein need not be performed in any particular order. Furthermore, although elements according to the embodiments of the present disclosure may be described or claimed in the singular, the plural is contemplated unless limitation to the singular is explicitly stated.

It should be understood that, as used herein, the singular forms "a", "an", and "the" are intended to include the plural forms as well, unless the context clearly supports the exception. It should also be understood that the term "and/or" as used herein refers to any or all possible combinations including one or more associated listed items. The serial number of the embodiments of the present disclosure is disclosed for description merely and does not represent the merits of the embodiments.

It may be appreciated by persons of ordinary skill in the art that all or part of the steps for implementing the above embodiments may be completed by hardware, or may be completed by instructing relevant hardware through a program. The program may be stored in a computer-readable storage medium, which may be a read-only memory, a magnetic disk or a compact disk, etc.

Persons of ordinary skill in the art will appreciate that the above discussion of any embodiment is intended to be exemplary merely, and is not intended to suggest that the scope (including the claims) of the embodiments of the present disclosure is limited to these examples; and combinations of features in the above embodiments or in different embodiments are also possible within the framework of the embodiments of the present disclosure, and many other variations of different aspects according to the embodiments of the present disclosure as described above are possible, which are not provided in detail for the sake of clarity. Therefore, any omission, modification, equivalent substitution, improvement, etc. made within the spirit and principles of the embodiments of the present disclosure shall fall within the scope of the embodiments of the present disclosure.

The invention claimed is:

1. A reusable software packaging method, comprising:

acquiring and scanning, by an initialization module, an original file to be installed and an execution script to be executed to generate metadata information, uploading the original file and the execution script to a file server, and storing the metadata information to a corresponding table of a data server; and the corresponding table comprises corresponding relationships between names, encrypted names, paths, hidden paths, and message digests of the original file and the execution script;

acquiring, by a packaging module, the original file and the execution script from the file server, acquiring the corresponding table from the data server, and verifying the original file and the execution script according to the metadata information in the corresponding table;

encrypting, by the packaging module, the execution script and the corresponding table, forming a package based on the original file, the encrypted execution script and the encrypted corresponding table, and adding an identification code generated based on an operation and maintenance platform and the package to generate a reusable software package;

verifying and decompressing, by an unpacking module, the reusable software package according to the identification code to obtain the package formed based on the original file, the encrypted execution script and the encrypted corresponding table; wherein, the identification code is used as an identifier to indicate that a file is not corrupted; and decrypting, by the unpacking module, the encrypted execution script and the encrypted corresponding table, uploading the original file and the execution script to the file server, and storing the metadata information of the encrypted and decrypted corresponding table to the corresponding table of the data server and updating the corresponding table of the data server;

if it is identified that the reusable software package is not corrupted, the reusable software package is decrypted and decompressed, and a data storage program is invoked to store files and script information to the file server and the data server;

and further comprising: performing, after obtaining the package formed based on the original file, the encrypted execution script and the encrypted corresponding table, additional secondary encryption on the package; and adding an identification code generated based on an operation and maintenance platform and the package comprises: determining the identification code based on the operation and maintenance platform and package metadata information generated from the package after the secondary encryption of the package, wherein the metadata information comprises original names, encrypted names, original paths, hidden paths, and message digests of the original file and the execution script; and adding the identification code to generate the reusable software package.

2. The method according to claim 1, wherein the corresponding table comprises one to one corresponding relationships between the original names, the encrypted names, the original paths, the hidden paths, and the message digests; and verifying the original file and the execution script according to the metadata information in the corresponding table comprises: verifying correctness of the original file and the execution script by using the message digests.

3. The method according to claim 1, wherein uploading the original file and the execution script to a file server comprises: uploading the original file and the execution script to the file server using a POST command; and storing the metadata information of the corresponding table to the corresponding table of the data server comprises: storing the metadata information of the corresponding table to the corresponding table of the data server using the POST command.

4. The method according to claim 1, wherein updating the corresponding table of the data server comprises: acquiring the updated metadata information using a GET command, and updating the corresponding table of the data server according to the updated metadata information using a PUT command.

5. The method according to claim 1, wherein before generating the reusable software package, the original file to be installed and the execution script are uploaded and automatically imported to the file server and a database server, and an initialization program and the data storage program are interacted to complete initialization.

6. The method according to claim 1, wherein the reusable software package only allows the operation and maintenance platform to use.

7. The method according to claim 1, wherein in the step of verifying and decompressing, by an unpacking module, the reusable software package according to the identification code to obtain the package formed by the original file, the encrypted execution script and the encrypted corresponding table, when it is identified that the reusable software package is not corrupted, the reusable software package is decrypted and decompressed, and the data storage program is invoked to store file and script information to the file and the database server.

8. A reusable software packaging device, comprising:
a processor; and
a memory storing a program code executable by the processor, the program code, when executed, performing operations comprising:
acquiring and scanning an original file to be installed and an execution script to be executed to generate metadata information, uploading the original file and the execution script to a file server, and storing the metadata information to a corresponding table of a data server; and the corresponding table comprises corresponding relationships between names, encrypted names, paths, hidden paths, and message digests of the original file and the execution script;
acquiring the original file and the execution script from the file server, acquiring the corresponding table from the data server, and verifying the original file and the execution script according to the metadata information in the corresponding table;
encrypting the execution script and the corresponding table, forming the package based on the original file, the encrypted execution script and the encrypted corresponding table, and adding an identification code generated based on an operation and maintenance platform and the package to generate a reusable software package;
verifying and decompressing the reusable software package according to the identification code to obtain the package formed based on the original file, the encrypted execution script and the encrypted corresponding table; wherein, the identification code is used as an identifier to indicate that a file is not corrupted; and
decrypting the encrypted execution script and the encrypted corresponding table, uploading the original file and the execution script to the file server, and storing the metadata information of the encrypted and decrypted corresponding table to the corresponding table of the data server and updating the corresponding table of the data server;
if it is identified that the reusable software package is not corrupted, the reusable software package is decrypted and decompressed, and a data storage program is invoked to store files and script information to the file server and the data server;
performing, after obtaining the package formed based on the original file, the encrypted execution script and the encrypted corresponding table, additional secondary encryption on the package; and
adding an identification code generated based on an operation and maintenance platform and the package comprises: determining the identification code based on the operation and maintenance platform and package metadata information generated after the secondary encryption of the package; wherein the metadata information comprises original names, encrypted names, original paths, hidden paths, and message digests of the original file and the execution script; and adding the identification code to generate the reusable software package.

9. The device according to claim 8, wherein the corresponding table comprises one to one corresponding relationships between the original names, the encrypted names, the original paths, the hidden paths, and the message digests; and verifying the original file and the execution script according to the metadata information in the corresponding table comprises: verifying correctness of the original file and the execution script by using the message digests.

10. The device according to claim 8, wherein performing, while forming the package based on the original file, the encrypted execution script and the encrypted corresponding table, additional secondary encryption on the package is further comprised; and adding an identification code generated based on an operation and maintenance platform and the package comprises: determining the identification code based on the operation and maintenance platform and package metadata information generated by the package after secondary encryption, and adding the identification code to the package.

11. The device according to claim 8, wherein uploading the original file and the execution script to a file server comprises: uploading the original file and the execution script to the file server using a POST command; and storing the metadata information of the corresponding table to the corresponding table of the data server comprises: storing the metadata information of the corresponding table to the corresponding table of the data server using the POST command.

12. The device according to claim 8, wherein updating the corresponding table of the data server comprises: acquiring the updated metadata information using a GET command, and updating the corresponding table of the data server according to the updated metadata information using a PUT command.

13. The device according to claim 8, wherein before generating the reusable software package, the original file to be installed and the execution script are uploaded and automatically imported to the file server and a database server, and an initialization program and a data storage program are interacted to complete initialization.

14. The device according to claim 8, wherein the reusable software package only allows the operation and maintenance platform to use.

15. A non-transitory computer-readable storage medium, storing a computer program that is executed by a processor, and upon execution by the processor, is configured to cause the processor to implement operations comprising:
   acquiring and scanning, an original file to be installed and an execution script to be executed to generate metadata information, uploading the original file and the execution script to a file server, and storing the metadata information to a corresponding table of a data server; and the corresponding table comprises corresponding relationships between names, encrypted names, paths, hidden paths, and message digests of the original file and the execution script;
   acquiring the original file and the execution script from the file server, acquiring the corresponding table from the data server, and verifying the original file and the execution script according to the metadata information in the corresponding table;
   encrypting the execution script and the corresponding table, forming a package based on the original file, the encrypted execution script and the encrypted corresponding table, and adding an identification code generated based on an operation and maintenance platform and the package to generate a reusable software package;
   verifying and decompressing the reusable software package according to the identification code to obtain the package formed based on the original file, the encrypted execution script and the encrypted corresponding table; wherein, the identification code is used as an identifier to indicate that a file is not corrupted; and
   decrypting the encrypted execution script and the encrypted corresponding table, uploading the original file and the execution script to the file server, and storing the metadata information of the encrypted and decrypted corresponding table to the corresponding table of the data server and updating the corresponding table of the data server;
   if it is identified that the reusable software package is not corrupted, the reusable software package is decrypted and decompressed, and a data storage program is invoked to store files and script information to the file server and the data server;
   performing, after obtaining the package formed based on the original file, the encrypted execution script and the encrypted corresponding table, additional secondary encryption on the package; and
   adding an identification code generated based on an operation and maintenance platform and the package comprises: determining the identification code based on the operation and maintenance platform and package metadata information generated after the secondary encryption of the package, wherein the metadata information comprises original names, encrypted names, original paths, hidden paths, and message digests of the original file and the execution script; and adding the identification code to generate the reusable software package.

16. The non-transitory computer-readable storage medium according to claim 15, wherein the corresponding table comprises one to one corresponding relationships between the original names, the encrypted names, the original paths, the hidden paths, and the message digests; and
   verifying the original file and the execution script according to the metadata information in the corresponding table comprises: verifying correctness of the original file and the execution script by using the message digests.

17. The non-transitory computer-readable storage medium according to claim 15, further comprising: performing, while forming the package based on the original file, the encrypted execution script and the encrypted corresponding table, additional secondary encryption on the package; and
   adding an identification code generated based on an operation and maintenance platform and the package comprises: determining the identification code based on the operation and maintenance platform and package metadata information generated by the package after secondary encryption, and adding the identification code to the package.

18. The non-transitory computer-readable storage medium according to claim 15, wherein uploading the original file and the execution script to a file server comprises: uploading the original file and the execution script to the file server using a POST command; and
   storing the metadata information of the corresponding table to the corresponding table of the data server comprises: storing the metadata information of the corresponding table to the corresponding table of the data server using the POST command.

19. The non-transitory computer-readable storage medium according to claim 15, wherein updating the corresponding table of the data server comprises: acquiring the updated metadata information using a GET command, and updating the corresponding table of the data server according to the updated metadata information using a PUT command.

* * * * *

UNITED STATES PATENT AND TRADEMARK OFFICE
CERTIFICATE OF CORRECTION

PATENT NO. : 12,430,107 B2  
APPLICATION NO. : 18/010317  
DATED : September 30, 2025  
INVENTOR(S) : Chengcheng Liu et al.

Page 1 of 1

It is certified that error appears in the above-identified patent and that said Letters Patent is hereby corrected as shown below:

On the Title Page

Item (72) should read:
(72) Inventors: Chengcheng Liu, Suzhou, Jiangsu (CN); Feng Li, Suzhou, Jiangsu (CN); Yongfei Sun, Suzhou, Jiangsu (CN)

Signed and Sealed this  
Eleventh Day of November, 2025

John A. Squires  
*Director of the United States Patent and Trademark Office*